June 10, 1924.    1,497,425
R. AMES ET AL
APPARATUS FOR AERATING SEWAGE AND OTHER FOUL LIQUIDS
Filed Sept. 23, 1922    2 Sheets-Sheet 1

INVENTORS:
Richard Ames
Matthew W. Mills
Joshua Bolton
By Wm Wallace White
ATTY.

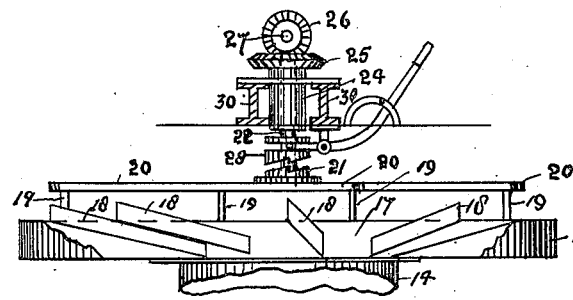
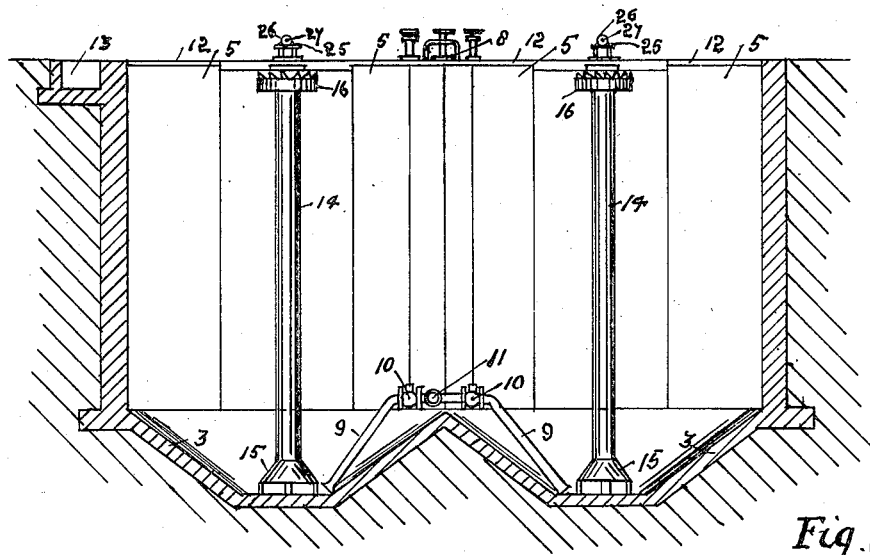
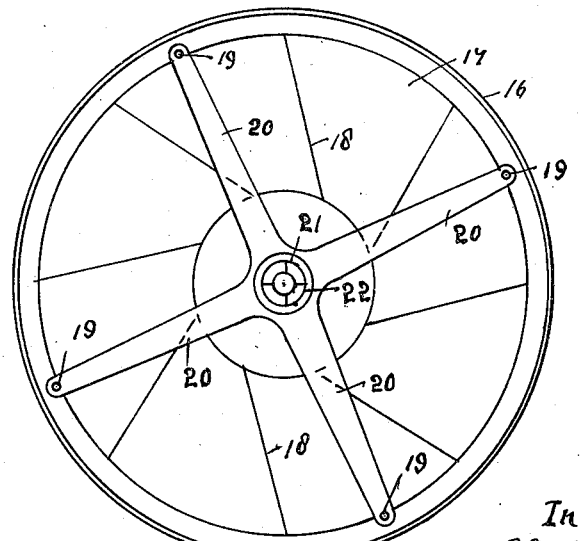

Patented June 10, 1924.

1,497,425

UNITED STATES PATENT OFFICE.

RICHARD AMES, OF BRIGHTON, MATTHEW WILLIAM MILLS, OF HEYWOOD, AND JOSHUA BOLTON, OF BURY, ENGLAND.

APPARATUS FOR AERATING SEWAGE AND OTHER FOUL LIQUIDS.

Application filed September 23, 1922. Serial No. 589,988.

*To all whom it may concern:*

Be it known that we, RICHARD AMES, MATTHEW WILLIAM MILLS, and JOSHUA BOLTON, subjects of the King of Great Britain, residing, respectively, at Brighton, in the county of Sussex, England; Heywood, in the county of Lancaster, England, and Bury, in the said county of Lancaster, have invented new and useful Improvements in Apparatus for Aerating Sewage and Other Foul Liquids, of which the following is a specification.

Our invention relates to improvements in apparatus for purifying sewage and other foul liquids by means of aerated or activated sludge, and the objects of our invention are:—

First, to dispense with the use of compressed air forced into the sewage tank, or air drawn down into the tank, in order to activate the sludge.

Second, to aerate the sludge by exposing the same to the atmosphere with a wave and spray action.

Third, to ensure a constant circulation of the activated sludge throughout the tank.

Fourth, to avoid the necessity for pumping sludge back into the tank after sludging, or laying off a tank or portion of a tank.

We obtain these objects by means of tanks and mechanism illustrated in the accompanying drawing in which:—

Fig. 2 is a section of one unit of the tank.

Fig. 3 is an elevation of the circulating mechanism.

Fig. 4 is a plan of the same with the driving gear removed.

Similar numerals denote the same parts throughout the several views.

Figure 1:
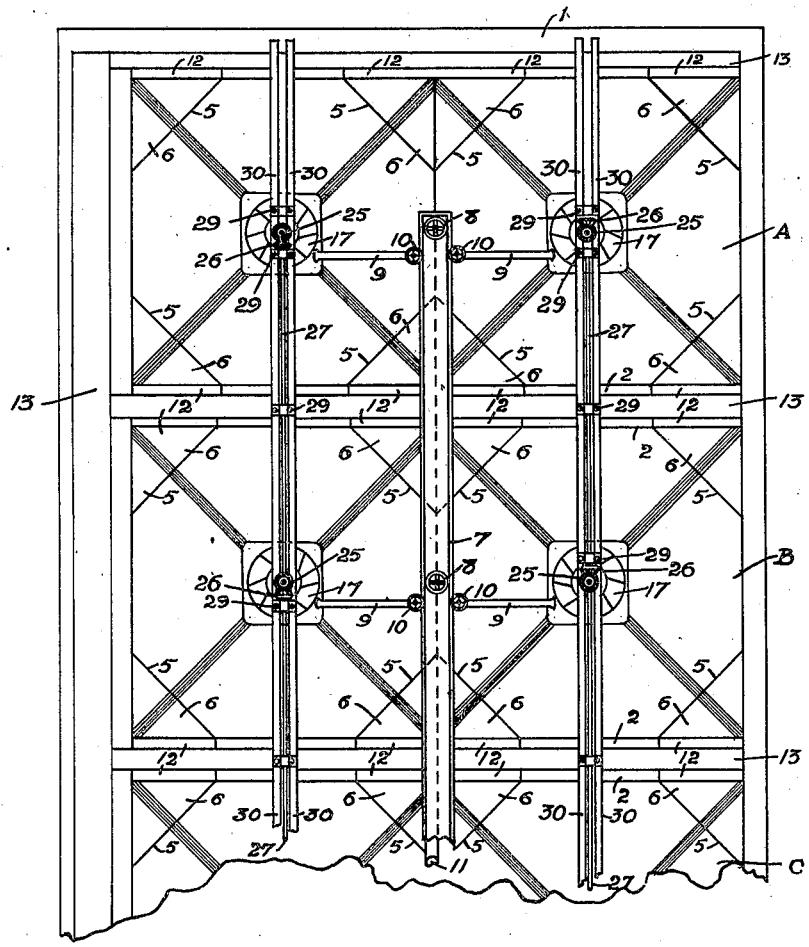
Fig. 1 is a plan of a portion of a sewage tank constructed according to this invention.

1 is the sewage tank which is divided by means of cross walls 2 into units A, B, C, etc., each unit being provided with means for raising sludge from the bottom of the tank and exposing it to the atmosphere with a wave and spray action before the sludge falls back into the tank.

The tank shown by the drawings is rectangular and contains a number of square units, it being found in practice that a rectangular tank besides being cheaper to make and equip, occupies less surface area for the quantity of sewage dealt with than a circular tank.

The bottom 3 of the unit slopes in all directions to the centre thereof (in order to compel the sludge to flow to the circulating pipes 14 up which the sludge is drawn to be aerated) the angles being filleted to prevent accumulation of sludge.

5, 5, 5, 5, are baffles made of reinforced concrete, expanded metal faced on both sides with cement, or of any other suitable material, to enable the corners 6, 6, 6, 6, of each unit to be utilized as settling areas in which the liquid is not agitated and the sludge sinks and flows down the inclined bottom to the circulating pipes 14 to be re-circulated for aeration.

The baffles 5, as shown, do not extend to the bottom of the unit but only to the commencement of the inclined bottom, for the reason hereinafter appearing.

7 is the inlet channel which extends the whole length of the tank, or thereabouts, and is provided with suitable inlet valves 8 to admit the crude sewage to the various units.

9, 9, are sludge pipes provided with sludge valves 10, 10, by means of which the sludge or contents of the unit may be run off through the pipe 11 to the sludge well of lagoon, the sludge pipes 9, 9, being connected to the pipe 11.

The purified effluent runs over the sills 12 into the effluent channel 13.

The mechanism for raising the sludge and keeping it in constant circulation comprises two circulating pipes 14 in each unit, each pipe being provided with a bell-mouth 15 at the bottom thereof.

The pipes 14 may be secured to the bottom of the unit, or they may be merely supported on feet, as shown by Fig. 2, the bottoms of the bell-mouths being only a few inches above the bottom of the unit.

The top of each pipe 14 forms a hopper 16 in which rotates a cone 17 open at the bottom and provided with blades 18, the cone being suspended above the hopper as hereinafter described.

The blades 18 may be either flat or form a portion of a helix or screw, and they may be curved or set at an angle, see Fig. 4, instead of radially, so as in all cases to cause the liquid discharged from the cone to strike the surface of the liquid in the unit with as great a force as possible in order to set up a wave and spray action, thereby obtaining the maximum amount of aeration, and also to impart a circular motion to the contents of the unit surrounding the circulating pipes so that the matters in suspension fall to the bottom (to be re-circulated) with a helical motion which brings the activated sludge or bacteria into more intimate contact, and for a longer period, with the impurities in the liquid than if the suspended matters fell in a straight line to the bottom of the unit.

The blades 18 project at their outer ends above the cone 17 and the top of the hopper 16.

Each cone is connected by means of rods 19 to cross-arms 20 secured to a sleeve 21 through which passes a vertical shaft 22 which rotates in ball bearings in a suitable pedestal 24 which is bolted to the girders 30, the cone rotating in the hopper 16 without touching it.

The shaft 22 is provided with a bevel wheel 25 which gears with a bevel pinion 26 secured to the longitudinal shaft 27.

A suitable clutch 28 is provided by means of which the cone 17 may be caused to rotate with the shaft 22 when the unit is working, or remain stationary when the unit is idle.

The shaft 27 is long enough to drive the cone in the last unit and is supported at suitable intervals in bearings 29 secured to the longitudinal girders 30.

The shafts 27 are preferably driven by means of an electric or other suitable motor situated at one end of the tank, the motor being connected to the said shafts by means of driving chains and sprocket wheels.

The cones in each unit revolve in opposite directions to avoid breaking up the circular motion of the liquid caused by the rotation of each cone.

In some cases, instead of clutching the cones to the shafts 22, the clutches may be made to clutch the pinions 26 to the shafts 27 when the units are working and release the said pinions when the units are idle.

The action of the apparatus is as follows:—

Assuming the tank to be empty, the inlet valves are opened and the sewage or other foul liquid flows from the inlet channel 7 into the various units and fills the tank: when the tank is full the motor is set in motion and the cones 17 rotated to draw the sludge and liquid from the bottom of the tank and discharge it with a wave and spray action over the top of the hoppers whereby the sludgy liquid is exposed to the atmosphere and aerated before falling back into the tank.

When the cones have been working a short time the contents of each unit are in swirls in opposite directions except in the settling areas 6 where the liquid is quiescent, and as the sewage or other liquid becomes purified and loses its density the purified liquid gradually rises in the areas 6 and runs over the sills 12 into the effluent channel 13.

Owing to the slope of the bottoms of the units and the rounded corners or angles of the same they are self-cleansing and the sludge gravitates to the bottom of the circulating pipes 14.

Should there be a surplus of sludge in any unit over and above the amount required for purification purposes, or when it is desired to put a unit out of action, the inlet valve 8 is closed and the cones 17 run until the liquid is purified, the surplus sludge, or the whole of the sludge, is then drawn off by opening the sludge valves 10, 10, the head of liquid in the unit forcing the sludge through the sludge pipes 9, 9, into the sludge pipe 11 which conducts it to the sludge well, or lagoon.

When a unit has been put out of action and it is desired to put it into action again, the sludge valves in the unit and in some other unit are opened, the head of liquid in the tank then forces sludge from one unit to the other unit and thus avoids the necessity for pumping sludge from one unit to another or from one tank to another.

Our apparatus is particularly applicable to situations in which the flow of sewage is subject to great fluctuations, as during the period of minimum flow as many units as are not required to deal with the flow can be cut out and be put into action again when the flow increases.

We claim:—

1. A rectangular sewage tank having a sloping bottom devoid of sharp angles, baffles suitably located in the corners of the tank the centre of the tank forming an area in which sewage is circulated and the corners of the tank forming settling areas, in combination with means for filling and emptying the tank and means for raising sludge from the bottom of the tank and exposing the same to the atmosphere with a wave and spray action for aerating before falling back into the tank, as specified.

2. In an apparatus for aerating sewage and other foul liquids the combination of a rectangular tank subdivided by means of cross walls into a number of compartments having sloping bottoms devoid of sharp angles, baffles suitably located in the corners of each compartment to enable the space between the baffles and the walls of the tank to form settling areas, and inlet channel located above said tank and provided with inlet valves over said compartments, effluent channels communicating with said settling areas, sludge pipes for emptying the tank and means for raising sludge from the bottom of the tank and exposing the same to the atmosphere with a wave and spray action before falling back into the tank, as specified.

3. A rectangular sewage tank divided by means of cross walls into a number of compartments each compartment being provided with a sloping bottom devoid of sharp angles, baffles suitably located in the corners of each compartment above the sloping bottom to enable the space between the baffles and the walls of the tank to form setting areas and means for raising sludge from the bottom of each compartment and exposing the same to the atmosphere with a wave and spray action for aeration, as specified.

4. A rectangular sewage tank divided by means of cross walls into a number of compartments having sloping bottoms devoid of sharp angles and baffles suitably located in the corners of each compartment above the sloping bottom, the centre of each compartment forming an area in which sludge is raised from the bottom of the tank and exposed to the atmosphere with a wave and spray action for aeration before falling back into the tank, the corners of the compartments forming settling areas, as described.

RICHARD AMES.
MATTHEW WILLIAM MILLS.
JOSHUA BOLTON.